Dec. 2, 1930.  H. KAGEYAMA  1,783,718
SIGNAL DEVICE FOR AUTOMOBILES
Filed April 3, 1923   2 Sheets-Sheet 1
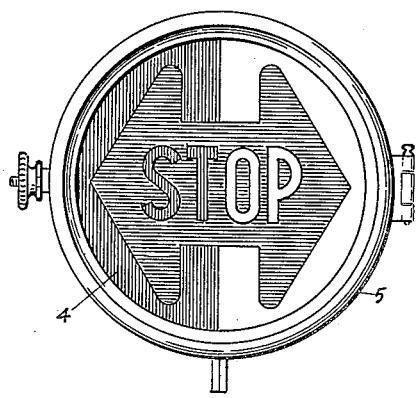
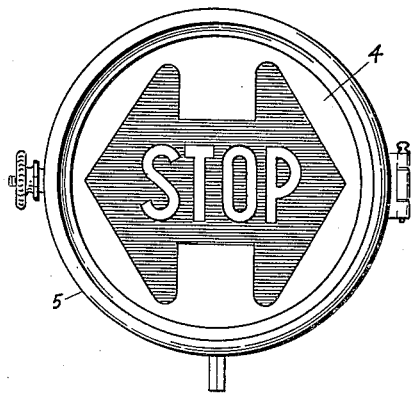
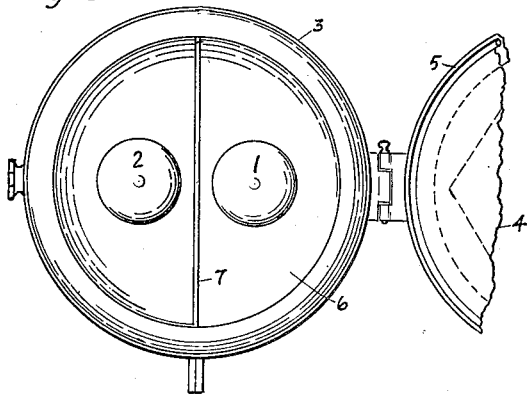
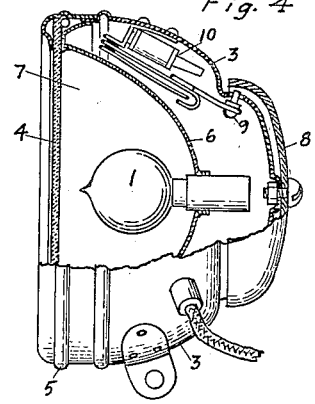
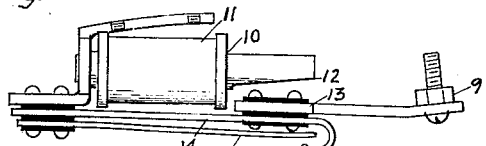
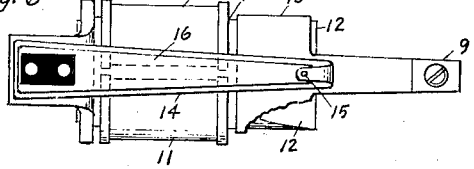
INVENTOR.
Hosaku Kageyama Dec. 2, 1930.  H. KAGEYAMA  1,783,718
SIGNAL DEVICE FOR AUTOMOBILES
Filed April 3, 1923  2 Sheets-Sheet 2
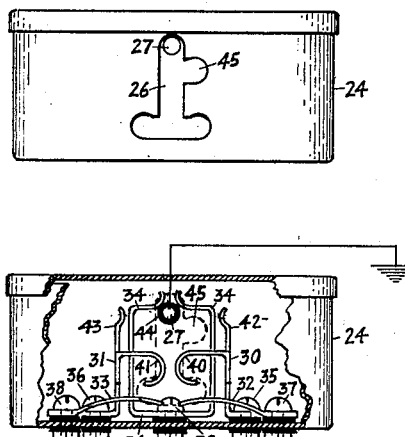
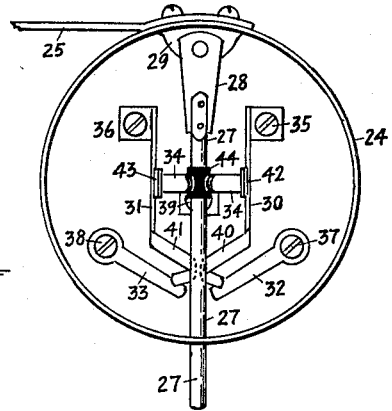
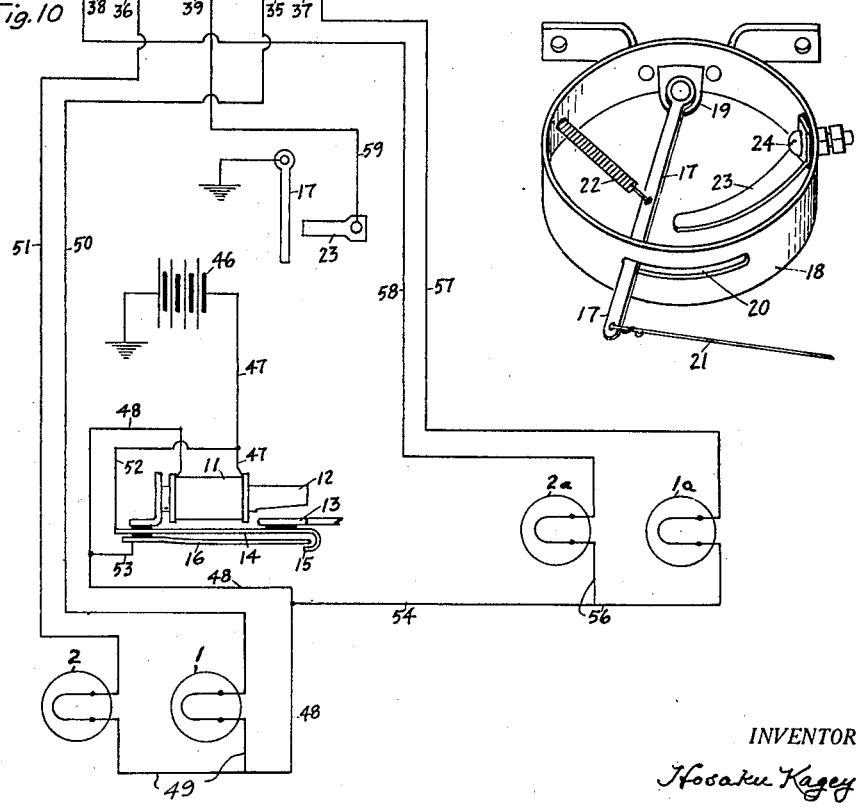
INVENTOR.
Hosaku Kageyama Patented Dec. 2, 1930

1,783,718

UNITED STATES PATENT OFFICE

HOSAKU KAGEYAMA, OF LOS ANGELES, CALIFORNIA

SIGNAL DEVICE FOR AUTOMOBILES

Application filed April 3, 1923. Serial No. 629,652.

This invention relates to a signal device for automobiles for indicating the direction in which the automobile is about to turn or indicating that the automobile is about to stop or slow up, and while primarily intended for this purpose it may be adopted in any situation where information may be similarly given.

An object of the invention is to provide a simple and intelligible indicator of this character which is operated or made visible by electric lamps.

Another object is to provide an electric bell to be operated simultaneously with the visual signal to give an instant audible alarm and to have the bell connected with the electric lamps so that the audible signal can be an indication to the operator that the visual signal has been operated, and therefore to provide for the bell an electrical arrangement which is best suited for the purpose or least interferes with the operation of the lamps.

Still other objects and advantages of my invention will appear from the following description.

Referring to the drawings:

Figure 1 is a front view of the signal giving one of signal indications.

Figure 2 is the same front view, but giving another indication.

Figure 3 is another front view of the signal when the front door of the casing is open.

Figure 4 is a side elevation of the same device showing a part of the casing broken off to give an inner view of the device.

Figure 5 is a detailed and enlarged view of a bell operating magnet shown in Figure 4.

Figure 6 is a bottom view of what is shown in Figure 5.

Figure 7 is a perspective view of a switch device to be operated by a brake, when the cover of the device is removed.

Figure 8 is a front elevation of a manually operated switch showing a slot in which a switch lever is manipulated.

Figure 9 is a top view of the same manual switch when the cover of the device is removed.

Figure 10 is a combined view of a front elevation of the manual switch and a circuit diagram, the switch being shown in the same position as in Figure 8, but the front of the casing being broken off to reveal various inside contacts with which other parts of the signal device is electrically connected.

The invention embodies a signaling device adapted to be placed on one or more points in any convenient position on an automobile or any other vehicle, and which is controlled by switch means from the driver's seat.

Figures 1 to 4 inclusive illustrate my signal device in which a pair of signal lamps, designated by numerals 1 and 2, are installed inside of a casing 3 having a transparent front, 4, through which light of the signal lamps is to shine. Said transparent front is made of a colored glass, upon the rear face of which are arranged minute prismatic forms to catch rays of the signal lamps giving brilliancy to the color.

Upon the front face of the glass, indicating signs are designed. In the present instance, the indicating signs are a combination of two arrows, and of a word Stop, as clearly shown in Figures 1 and 2. The arrowed area is painted dark and made opaque to the inside lights, except the word Stop, which is left transparent. The opaque portion which is shown shaded by horizontal lines in Figures 1 and 2 is slightly depressed from the remainder of the front face of the glass, giving a form of relief to the transparent parts to improve the appearance of the indicator and at the same time to make the painting work of the opaque portion easy.

The front glass is mounted on a front frame, 5, which forms a hinged door to the casing and can be opened whenever access is desired to the signal lamps within, as shown in Figure 3.

The signal lamps are mounted upon a concave reflector, 6, which carries a partition, 7, dividing the space into two compartments, in each of which a respective signal lamp is located, so that each signal lamp illuminates the respective half of the transparent front.

With this arrangement, if it be desired to indicate the turning to the right, the signal lamp in the right compartment is operated which illuminates the right half of the front, giving an indication shown in Fig. 1, in which the white area represents the illuminated and colored part, defining the contour of an arrow pointing to the right. In the same way, if the left turn is to be indicated, the lamp in the left compartment is operated which will illuminate the other half of the front, giving an indication similar to the other, but with an arrow pointing to the opposite direction. In each case, either half of the word Stop has to be illuminated, but either of these fractional parts carries no meaning, and will hardly operate to confuse the meaning of the indication which is predominated by the arrow-head.

In case the operator desires to indicate that the automobile is about to stop, he has to operate both signal lamps simultaneously, which will illuminate the whole front and give an indication illustrated in Fig. 2, in which the arrows, pointing both ways, mean neither direction, while the completed word Stop forms a commanding sign which speaks the meaning of the indication.

To attract the attention of those around the vehicle which is about to turn or stop, and cause them to look at the indicator, an electric bell, 8, is provided and a vibrating hammer, 9, for striking the bell is operated by a magnet, 10. This magnet is connected in series with the signal lamps, 1 and 2, in order that the operation of the bell can be an indication to the operator that the signal lamps have been lighted.

In the usual construction of bell magnets, the vibrating action of the hammer is rendered to make and break the circuit of the magnet for intermittent energization of the same, which in turn causes the vibration of the hammer. If a magnet of this arrangement be connected with the signal lamps, the only intermittent flow of current through the lamps is secured, diminishing materially the light of the lamps, or seriously cutting down their efficiency.

To overcome this difficulty, a slight departure from the customary construction has been made in arranging the operating parts of the bell magnet which is illustrated in Figures 5 and 6, in which numeral 11 represents the magnet coils which energize pole pieces, 12, the latter being extensions of the magnet cores with flattened faces as shown, to attract a vibrating armature, 13, which operates the hammer, 9. The armature, 13, is carried by a spring, 14, which is insulated from the armature and from the frame of the magnet to which it is attached. The end of the spring, 14, is turned back as shown and provided with a contact point, 15. A contact finger, 16, mounted on the same frame as the spring, 14, and insulated from both the frame and the spring, extends in parallel with the latter and is adapted to make an electrical connection with the contact point, 15, when the armature, 13, is attracted by the magnet poles.

This device is operated in the following manner: The coils, 11, are connected at one end to the signal lamps and at the other end to the battery, so that it forms a permanent and unbroken route of circuit when the operator's switch is closed. The coils, 11, are thus energized by the current from the battery on its way toward the signal lamps, causing the armature, 13, to be attracted and the contact point, 15, is brought into connection with the contact finger, 16. One end of the coil, 11, is connected with the spring, 14, and the other end with the contact finger, 16, so that the connection of the contact point, 15, with the contact finger, 16, causes a short circuit around the coils, 11, resulting in the de-energization of the magnet, and this in turn causes the return of the armature toward the original position and then the separation of the contact point, 15, from the contact finger, 16, thus completing a cycle of the operation, which is repeated and causes the vibration of the hammer.

From the foregoing it can be seen that during the energization of the magnet, current through the signal lamps is established through the magnet coils, the same as in case of the customary construction of the bell magnet aforementioned, while during the de-energization of the magnet, instead of the complete cessation of the current through the signal lamps, as it may be the case with the customary construction, the flow of the current through the signal lamps, in the present instance, is maintained by the short circuiting and therefore more direct route of the contact point, 15, and the contact finger, 16, with an effect that not only the signal lamps receive a continuous flow of current, but the reduction of available voltage of the signal lamps resulting from the introduction of the magnet coils into the circuit, is only partial, as, through a considerable part of the duration, the signal lamps are supplied with current through a direct route, so that the introduction of this magnet device into the lighting circuit can be made without any noticeable diminution of light in the part of the signal lamps.

A study of the circuit diagram which will be hereafter described, will make clearer the mode of operation heretofore recited.

While the foregoing description especially relates to a rear signal which is to be mounted on the rear end of the automobile to indicate signals to closely following vehicles, another signal is desired at the front of the car, to signal to oncoming vehicles and to pedestrians.

However, in case of the front signal there would be no use of indicating a stop as its danger concerns the rear end only, and also there would be no need of duplicating the bell as the sound of the rear signal bell can be heard at the front also, and then the bell can be connected with the front signal so that one bell serves for both signals.

For this reason, in case of the front signal, the bell is dispensed with and the word Stop is eliminated from the indicating sign of the front. Otherwise the front signal is exactly the same in construction as the rear signal.

Switches for controlling the signal are of two forms. Figures 8 to 10 inclusive illustrate one form which is operated directly by the driver's hand and intended to give all of the signal indications, while Fig. 7 illustrates another form which may be connected to a brake operating mechanism, to be automatically operated when the brake is applied and is intended to give the stop indication only. The latter form is for the case of emergency in which the driver, owing to a circumstance arising at the front, is obliged without premeditation to bring his car to a sudden stop, while in ordinary cases an indication for the stop may be given beforehand by means of the other form.

Referring to Fig. 7, a switch lever, 17, is provided inside of a casing, 18, which may be mounted on the frame of the automobile at any suitable position. The lever, 17, is pivoted at one end to a lug, 19, which is secured to the casing and the other end extends through a slot, 20, formed on the side of the casing and to this extending end is attached a wire, 21, which is to be connected with a brake operating mechanism. The switch lever, 17, is normally held at the position shown, by a spring, 22, and when the brake is applied, the wire, 21, pulls the lever to the right along the slot, bringing the lever into contact with a contact, 23, to make switch connection for operating the signal. The lever, 17, is in electrical connection with the casing which is grounded while the contact, 23, is insulated from the casing on which it is mounted. A screw, 24, which secures the contact to the casing, provides at the outside of casing a binding post for a transmission wire which will carry current to the signal in a manner hereafter to be described.

Referring to Figures 8 to 10 inclusive, the manually operated switch comprises a casing, 24, adapted to be mounted on the steering column or any suitable part of the car by a frame, 25. On the front wall of the casing, a slot, 26, is cut as shown in Fig. 8. Inside of the casing is located a switch lever, 27, one end of which is secured to a spring, 28, and by which it is pivoted to a bracket, 29, provided on the wall of the casing. The other end of the lever extends through the slot, 26, and is adapted for manipulation along the slot by the operator. Forming a part of the slot, are provided a number of notches extending horizontally for locating the switch lever, 27, to make switch connections. Inside of the casing, there are installed a number of contacts, as designated by the numerals 30, 31, 32, 33 and 34, and they are secured respectively by screws 35, 36, 37, 38 and 39 to the bottom of the casing from which they are insulated, while the screws, extending through the bottom of the casing, provide, at the other side, binding posts for the respective transmission wires as shown in Fig. 10.

The contacts 30 and 31 have respectively horizontally extending arms, 40 and 41, the ends of which are curved back as shown. An idea of the disposition of these contact members with regard to the slot, 26, can be had in Fig. 10 in which the outline of the slot is indicated in dotted lines. The lever, 27, is normally held at the top of the slot by the spring, 28, which acts upward. The rounded portions of the contact arms are placed close to each other to make it difficult for the lever to pass between. These contact members are, however, resilient enough to permit the lever to pass down when the latter is forced through, but will prevent its return passage by its own force when the same is released, so that the lever is held against the lower sides of the curved arms and then in contact with them. This is the position of the switch lever for the stop indication.

The contact 32 extends horizontally and its end is brought just under and opposite to the lower end of the arm of the contact 30, as shown in Fig. 10. This will permit the switch lever, 27, to be placed in contact with both contacts 30 and 32, when the lever is registered with the lower right side notch and this is the position of the lever for the right turn indication.

In the same way when the switch lever is placed in the left side notch at the bottom of the slot, it is placed in contact with both contacts 31 and 33, giving the left turn indication to the signal.

The contacts 30 and 31 are provided respectively with vertically extending arms, 42 and 43, the purpose of which is to make connection with another contact, 34. The contact 34 runs vertically in two sections each opposite to the arm 42 or 43, and then turns horizontally and finally ends in the upturned ends which are placed close to one another as shown in the drawing. When the switch lever is placed at the top of the slot as it is done normally, it rests against the curved sides of the upturned ends of the contact, 34, and forces its two sections to set wider apart, placing them in contact with the arm, 42, and with the arm, 43. As the contact 34 is connected to the brake operated switch, as can be seen in the circuit diagram which will be presently described, the brake operated switch is, by the above arrangement, connected to both contacts 30 and 31, and through them it is connected to the signal. If, however, the operator desires to cut out the brake switch, the switch lever, 27, may be placed in another notch designated by 45 and this will release both sections of the contact 34 to spring back and separate from the contact 30 and the contact 31, isolating the brake switch.

The switch lever, 27, is covered by an insulating material, 44, at the place where it comes into contact with the contact 34, as, while the switch lever is grounded and carries electrical current, its function with the contact 34 is not to make one another's connection, but to connect the latter with other contact members as explained before.

In Fig. 10, connected with the aforementioned manual switch, a circuit diagram is shown, in which the signal lamps and the bell magnet of the rear signal are grouped at the lower left corner, and the signal lamps of the front signal as designated by numerals 1a and 2a, are grouped at lower right corner while the battery is designated by numeral 46.

The electrical connections are as follows: The battery, 46, is grounded at one side to the body of the automobile. A wire, 47, leads from the other side of the battery to the rear signal and is connected to the one end of the coil, 11, of the bell magnet. A wire, 48, leads from the other end of the coil, 11, to wire, 49, which connects one side of the lamp 1 with one side of the lamp 2. A wire, 50, leads from the other side of the lamp 1 to the screw, 35, of the manual switch, the switch lever, 27, of which is grounded. A wire, 51, leads from the other side of the lamp 2 to the screw, 36.

A wire, 52, makes connection between the wire 47 and the spring, 14, of the magnet; and a wire, 53, makes connection between the wire 48 and the contact finger, 16, of the magnet. This completes the connections of the rear signal, and for the front signal, a wire, 54, which is connected with the wire 48, leads from the rear signal to front signal and is connected with a wire, 56, which connects one side of the lamp 1a with one side of the lamp 2a. A wire, 57, leads from the other side of the lamp 1a to the screw, 37, of the switch. A wire, 58, leads from the other side of the lamp 2a to the screw, 38. For the brake operated switch, a wire, 59, leads from the screw, 39, of the manual switch to the contact, 23, while the switch lever, 17, is grounded.

The operation is as follows: If it be desired to signal the right turn, the operator will place the switch lever, 27, in the lower right hand notch, which will place the lever in contact with the contacts 30 and 32. The circuit then is established from the battery through wire 47, through coil 11, wire 48, and wire 49 to signal lamp 1, and then through wire 50, screw 35, contact 30, and the lever 27 to ground, and at the same time a branch circuit is established to the front signal, from wire 48, through wires 54 and 56 to the lamp 1a, thence through wire 57, screw 37, contact 32, and the lever 27 to ground. As soon as the coil 11 is energized, the armature 13 is attracted by the magnet poles, 12 bringing the contact point 15 into contact with the contact finger 16, which will give another route of current from wire 47, through wire 52, spring 14, contact point 15, contact finger 16 and wire 53 to wire 48. This route will short circuit the coil 11 and when this happens the magnet is deenergized and the armature is released and springs back, causing the separation of the contact point 15 from the contact finger 16. As soon as this happens, the current resumes its course through the coil 11, repeating the operation, and thus the bell is operated. While the bell is operated, the lamps 1 and 1a are supplied with current alternately through coil 11 and through the short circuiting route and thus the lamps are operated.

This will give for the rear signal an indication shown in Fig. 1, and for the front signal a corresponding indication which will suggest the operator's right, though it may be at the observer's left.

If the operator desires to signal his intention of turning to the left, he places the switch lever, 27, into the left hand notch at the bottom of the slot, which puts the lever in connection with both contacts 31 and 33. If this circuit be traced the same as before, it will be found that this is merely a duplication of the previous operation in which the lamps 1 and 1a have been replaced by the lamps 2 and 2a, which will illuminate, in each of the front and the rear signals, the other half of the transparent front and the indicators will point to the operator's left.

If the operator wishes to indicate that he is coming to a stop, he pulls down the switch lever, 27, to the bottom of the vertical slot, and then releases. The lever then will be held in contact with the lower sides of the curved arms of the contacts 30 and 31. This places, as can be easily seen in the circuit diagram, both signal lamps of the rear signal in circuit, the resulting indication then being one that is shown in Fig. 2, while the bell is operated in the same way as before.

When the operator gets through with signaling and the switch lever, 27, is assisted to pass up the narrow passage between two contact arms, the lever will automatically spring back to the top of the slot. While at this position, the lever, as mentioned before, is pushing apart two sections of the contact 34, connecting it with both contacts 30 and 31. While in this condition, if the operator applies the brake and thereby operates the lever 17 of the brake switch into connection with the contact 23, the contacts 30 and 31 will be connected to the ground through the contact 34, screw 39, wire 59, contact finger 23, and the lever 17. This operates the rear signal into the stop indication, the same as was done by the hand-operated switch lever 27.

When the signal is not desired while the brake is applied, as for example when standing on or descending a grade, the operator will shift the switch lever, 27, to the notch, 45, and this will cause separation of the contact 34 from the contacts 30 and 31, opening the circuit that was closed by the brake.

It is assumed that all lamps are of same size, and it has been shown that, in each of the foregoing signal operations always two lamps have to participate, so that the amount of current is same in the various operations. In a device of this nature, it is desirable that the maximum amount of current that may be used in the operations be kept down, as, to make these signals clearly visible in the day time, lamps of high candle power are necessary which will fairly tax the source of the current and the transmission wires, particularly when a number of lamps have to participate in the operation to take a large amount of current. The fact that, in the rear signal, two lamps are simultaneously operated to secure another indication, though simplified the parts, but is not without an accompanying disadvantage as two lamps take twice as much current as one, and the whole circuit system must be provided for this maximum amount of current. But this ceases to be a disadvantage when the rear signal is considered in connection with the front signal, as to operate two signals simultaneously—one at the front and one at the rear—two signal lamps are necessary as a minimum number, and the simultaneous operation of the rear signal lamps does not add to the maximum amount of current that is required for other signal operations, so that simplification of the rear signal is secured without accompanying disadvantage, and the present arrangement represents a desirable combination of two signals.

The advantage of the present arrangement becomes more pronounced when the device is to be used in connection with an auxiliary signal, as represented in the present instance by the bell which, having been made thus to receive always same amount of current, operates uniformly through various operations and its parts can be best proportioned to suit this amount of current.

In the above signal operations, if any of the lamps burned out or otherwise not operated, the current through the bell is reduced and the much diminished tone of the bell, if it ever operated, will remind the operator of the trouble.

This device can be operated without the front signal, and in this case, however, the bell receives current for one lamp in case of the right or the left indication, while it receives current for two lamps in case of the stop indication; so that the bell tends to ring louder in one case than the other, and has to best compromise for two tones, while this condition can be somewhat improved by proportioning the magnet cores or the armature to be well in magnetic saturation when operated under the larger current.

As the lamps 1 and 2 of the rear signal have each to be operated independently of the other, as in case of the right or the left indication, they are provided necessarily with separate leads and contacts as that is the case with the manual switch, and when both lamps are simultaneously operated, as in case of the stop, both contacts have to be connected into the circuit. But this is not the case with the brake switch in which a single lead, 59, is connected to a single contact, 23. This simplification has been secured by the arrangement of the contact 34, which keeps normally both contacts 30 and 31 in connection with one another. Otherwise, the brake switch has to be provided with two leads and two contacts, and then the brake switch ought to be connected directly to the transmission wires, 50 and 51, as the brake switch is located under the floor of the car and close to these wires.

There is another reason that the brake switch cannot be connected directly to the transmission wires, as there is a necessity of cutting out the brake switch from the electrical connection as explained before, and such cut out must be within the reach of the operator. The contact 34 permits this cut out to be done, and then by no other means than the same switch lever, 27, that is primarily intended for the operation of the signal.

When the switch lever 27, is operated to the position of the right or the left, intending to indicate the turning, the driver steps on the brake pedal, as that is often done merely for purpose of retarding the speed of the car, and operates the brake switch, and this, if no other means, would result in display of a signal sign, meaning a stop in the rear signal, thereby causing a confusion in the signal indication. But in the device presented, this does not occur as when the switch lever is brought down to register with either turning indication, the brake switch is automatically cut out, and this cut out is done, as can be easily seen, by the arrangement of the contact 34; so that the contact 34, from the foregoing, combines three features of, firstly, simplifying the electrical connections of the brake switch; secondly, providing a cutout for the same; and thirdly, avoiding the confusing indication.

While I have described the preferred form of carrying out my invention, it should be understood that I do not limit myself to the specific construction shown.

What I claim is:

1. A signaling device comprising an electric signal lamp to give a visual signal, an electric audible signal in co-operation with the visual signal to announce the operation of the latter to the operator, a vibrator for operating said audible signal and magnetic coils for operating said vibrator, said magnetic coils being connected in series circuit with said signal lamp, said vibrator being adapted to short circuit said magnetic coils, as it vibrates, for producing the vibratory motion.

2. An electric signal for vehicles comprising an indicating means consisting of two lamps, a manually operated selective switch, a brake operated switch, and conducting means interconnecting each switch and the lamps and also interconnecting the two switches whereby with the manual switch in a neutral position the operation of the brake illuminates both lamps, and whereby operation of the manual switch to a selected position positively illuminates a selected lamp only and renders the brake operated switch ineffective.

3. A signaling device comprising an electric signal lamp to give a visual signal, an electrically operated bell in co-operation with the visual signal to announce the operation of the latter to the operator, a hammer for striking said bell, an armature for operating said hammer and magnetic coils for attracting said armature, said magnetic coils being connected in series circuit with said signal lamp, said armature being adapted to short circuit, said coils, when attracted by the same, thereby permitting said signal lamp to receive electrical current more directly from the source of current.

HOSAKU KAGEYAMA.